United States Patent
Rhoten

[19]

[11] Patent Number: 6,122,857

[45] Date of Patent: Sep. 26, 2000

[54] FISHING JIG FOR USE WITH A RUBBERY LURE

[76] Inventor: Gregory D. Rhoten, 226 N. Linden Ave., Highland Springs, Va. 23075

[21] Appl. No.: 09/272,525

[22] Filed: Mar. 22, 1999

[51] Int. Cl.[7] .................................................. A01K 83/06
[52] U.S. Cl. ...................... 43/44.81; 43/43.16; 43/42.37; 43/42.39
[58] Field of Search ................. 43/43.16, 44.81, 43/44.83, 44.8, 42.37, 42.39

[56] References Cited

U.S. PATENT DOCUMENTS

| | | | |
|---|---|---|---|
| 497,962 | 5/1893 | D'Ivernois | 43/43.16 |
| 2,750,704 | 6/1956 | Bemis | 43/43.16 |
| 2,795,076 | 6/1957 | Luft | 43/42.39 |
| 2,795,886 | 6/1957 | Johnson | 43/44.81 |
| 2,926,454 | 3/1960 | Gottman | 43/44.83 |
| 2,989,817 | 6/1961 | Kepler | 43/42.39 |
| 3,500,576 | 3/1970 | Ostrom | 43/43.12 |
| 3,868,784 | 3/1975 | Sabol | 43/42.37 |
| 4,232,470 | 11/1980 | Steffick | 43/43.16 |
| 4,294,031 | 10/1981 | Manno | 43/43.16 |
| 4,530,180 | 7/1985 | Gwaldacz, Sr. et al. | 43/42.28 |
| 4,819,366 | 4/1989 | Manno | 43/44.81 |
| 4,905,403 | 3/1990 | Manno | 43/43.16 |
| 5,105,575 | 4/1992 | Robertaccio | 43/44.8 |
| 5,182,876 | 2/1993 | Lewis | 43/42.39 |
| 5,373,658 | 12/1994 | Huppert | 43/42.39 |
| 5,628,139 | 5/1997 | Rhoten | 43/44.83 |
| 5,649,384 | 7/1997 | Manning | 43/44.81 |
| 5,664,364 | 9/1997 | Clark | 43/43.16 |

*Primary Examiner*—Kurt Rowan
*Attorney, Agent, or Firm*—Norman B. Rainer

[57] ABSTRACT

A fishing jig, particularly useful in conjunction with a soft bodied artificial bait to produce a lure having specialized movement when pulled through water, includes a fish hook component of integral construction having a leading extremity, a curved trailing extremity provided with a barbed tip, and a shank portion extending between the leading and trailing extremities. A line-attachment eyelet is fashioned in the shank portion by bending, and is forwardly inclined toward the leading extremity. A weight component of streamlined shape is associated with the leading extremity.

4 Claims, 2 Drawing Sheets

FISHING JIG FOR USE WITH A RUBBERY LURE

BACKGROUND OF THE INVENTION

1. Field of the Invention

This invention relates to the sport of rod and reel fishing, and more particularly concerns a jig which, when pulled through water at the end of a fishing line, imparts beneficial motion to a rubbery lure attached to said jig.

2. Description of the Prior Art

Fishing devices known as jigs, jig heads, fishing jigs or jig lures have long been used in sport fishing. Such devices are comprised of a fish hook having a barbed trailing or rearward extremity, a shank portion, and a leading or forward line attachment extremity opposite from said barbed extremity. A weight, usually of lead, is generally associated with said leading extremity. An eyelet which facilitates attachment of a fishing line is associated with said leading extremity. The eyelet is usually integral with the shank having been formed by a bending operation, and may be emergent from the weight or separate therefrom. Fish-attracting means in the form of natural or artificial baits are disposed upon the hook.

A conventional jig lure can be cast and retrieved, trolled or jerked up and down vertically. Because the fishing line is attached to the lure at its weighted leading or head extremity, the lure rides head down with the barbed rearward tip extremity facing up. This provides some degree of immunity to snags.

Various specialized modifications of jig lures have earlier been disclosed for achieving distinctive fish-attracting movements or appearances. For example, U.S. Pat. No. 5,182,876 to Lewis concerns a balanced jigging lure having a T-shaped shank with an upwardly directed arm provided with an eyelet for line attachment. Suitable artificial or live bait is applied to the barbed top portion. When manipulated in an up and down motion, the lure assumes a substantially horizontal disposition, and produces a fish-like movement. U.S. Pat. No. 4,530,180 to Gwaldaz discloses a jig lure whose shank portion has a right angle bend which forms an arm having an upwardly disposed eyelet for line attachment. A pliable fish-attracting element is disposed upon the barbed portion of the hook. U.S. Pat. No. 4,819,366 to Manno relates to a fishing jig having a shaft which is bent in a manner to permit knotless attachment to a fishing line.

Some of the aforementioned earlier jig lines are of expensive construction because of the need to solder together separate components. Those earlier fishing jigs which have line-attachment eyelets disposed above the shank portion prevent the proper mounting of a rubbery lure upon said shank portion. Few earlier fishing jigs contemplate use in a trolling manner with a rubbery lure whose motion is interactively dependent upon the construction of the jig.

It is accordingly an object of the present invention to provide a fishing jig adapted for use with a rubbery fishing lure component.

It is another object of this invention to provide a fishing jig as in the foregoing object which permits the mounting thereupon of a rubbery lure component in a proper orientation for fishing purposes.

It is a further object of the present invention to provide a fishing jig lure comprised of the fishing jig of the aforesaid nature in combination with a rubbery lure component of specialized construction.

It is a still further object of this invention to provide a fishing jig of the aforesaid nature of simple construction amenable to low cost manufacture.

These objects and other objects and advantages of the invention will be apparent from the following description.

SUMMARY OF THE INVENTION

The above and other beneficial objects and advantages are accomplished in accordance with the present invention by a fishing jig comprising:

a) a fish hook component of integral construction having a curved trailing extremity provided with a barbed tip, and a shank portion extending forwardly from said trailing extremity to a leading extremity, said shank portion having fashioned therein by bending a line-attachment eyelet, said eyelet being directed upwardly toward said barbed tip and forwardly inclined toward said leading extremity, and b) a weight component of streamlined shape associated with said leading extremity.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
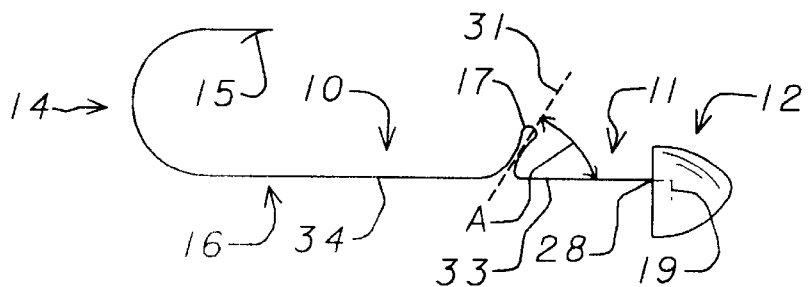
FIG. 1 is a side view of a first embodiment of the fishing jig of this invention.

Referring now to FIG. 1, a first embodiment of the fishing jig 10 of the present invention is shown comprised of a fish hook component 11 and weight component 12. The lure 22 of FIGS. 4–6 incorporates a soft bodied bait component 13 disposed on the fishing jig of FIG. 1.

Hook component 11 is of integral construction, having been fabricated of steel wire stock of circular cross-section. Said hook component is comprised of a curved trailing extremity 14 equipped with a barbed tip 15, and a shank portion 16 extending forwardly from said trailing extremity to a leading extremity 28. A line-attachment eyelet 17 is located within said shank portion, having been fashioned by the controlled bending of said shank portion. Said eyelet is upwardly emergent from said shank portion, namely emergent from that site of the circular cross section of the shank portion which faces tip 15. Eyelet 17 is disposed in coplanar relationship with said curved trailing extremity 14, and is forwardly inclined toward leading extremity 28. The height of eyelet 17, namely the distance it extends from said shaft portion, is preferably a minimal amount consistent with the propensity with which the wire stock can be bent to produce said eyelet. The portion of shank portion 16 which extends between eyelet 17 and leading extremity 28 may be referred to as the leading section, designated by numeral 33. The angle of inclination of said eyelet, denoted in FIG. 1 as angle A taken between the longitudinal centerline 31 of eyelet 17 and said leading section 33, is preferably between 30 and 70 degrees. The portion of shank portion 16 extending between eyelet 17 and trailing extremity 14 is designated trailing section 34. The overall length of shank portion 16 may range between 15 mm. and 50 mm. in different embodiments of the fishing jig of this invention.

Figure 2:
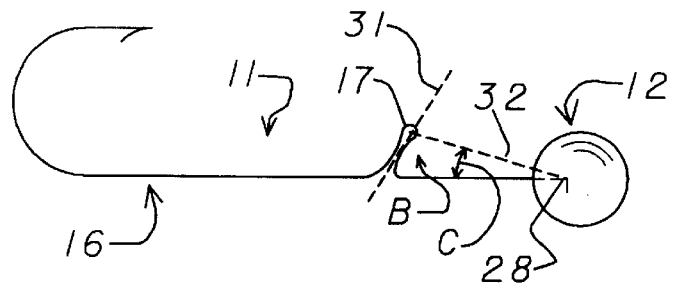
FIG. 2 is a side view of a second embodiment of the fishing jig of this invention.

The height and angle of inclination of said eyelet in conjunction with the location of the eyelet along the shank portion define a triangle B shown in FIG. 2 and which includes an imaginary line 32 drawn between leading extremity 28 and the uppermost point of eyelet 17. The configuration of said triangle affects the manner of motion of the fishing jig when it is pulled through the water by fishing line 18 attached to eyelet 17.

Weight component 12 is preferably fabricated of lead, and has a streamlined shape such as the forwardly tapered wedge configuration of the first embodiment of FIG. 1, or the spherical configuration of the second embodiment of FIG. 2. The lead weight is preferably molded directly onto the leading extremity of the shank, as shown in the embodiments of FIGS. 1 and 2. In order to expedite the securement of the molded weight, said leading extremity is provided with anchoring protuberance 19 which is preferably formed by the bending of the shank portion. Weight component 12 may have a weight ranging between 8 and 17 grams for different embodiments of the fishing jig, with the lighter weights being employed with the jigs having shorter shank portions. The preferred fishing jigs of this invention may be characterized in having a ratio of shank portion length (expressed in millimeters) to weight of said weight component (expressed in grams) of between 1.8 and 3.0.

Figure 3:
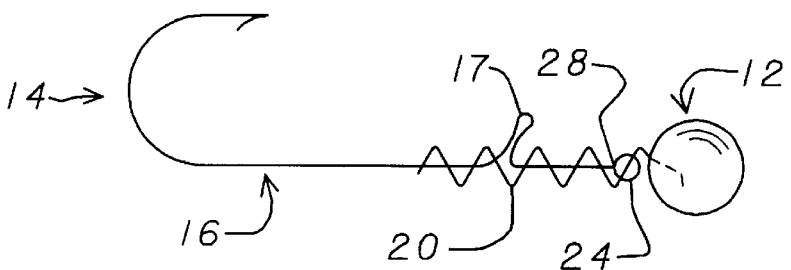
FIG. 3 is a side view of a third embodiment of the fishing jig of this invention.

In the third embodiment of the fishing jig of this invention, shown in FIG. 3, the weight component is removably attached to the shank portion by way of a stiff spiralled wire 20 anchored in the weight and which, when rotated upon the axis of elongation, self-feeds onto said shank portion. In this embodiment, protuberance 19 is a guiding eyelet 24. The use of such spiralled wire to interengage fishing line components is further described in U.S. Pat. No. 5,628,139 to Rhoten. The size of the weight component may be varied, especially in combination with hook components of varied sizes.

Figure 4:
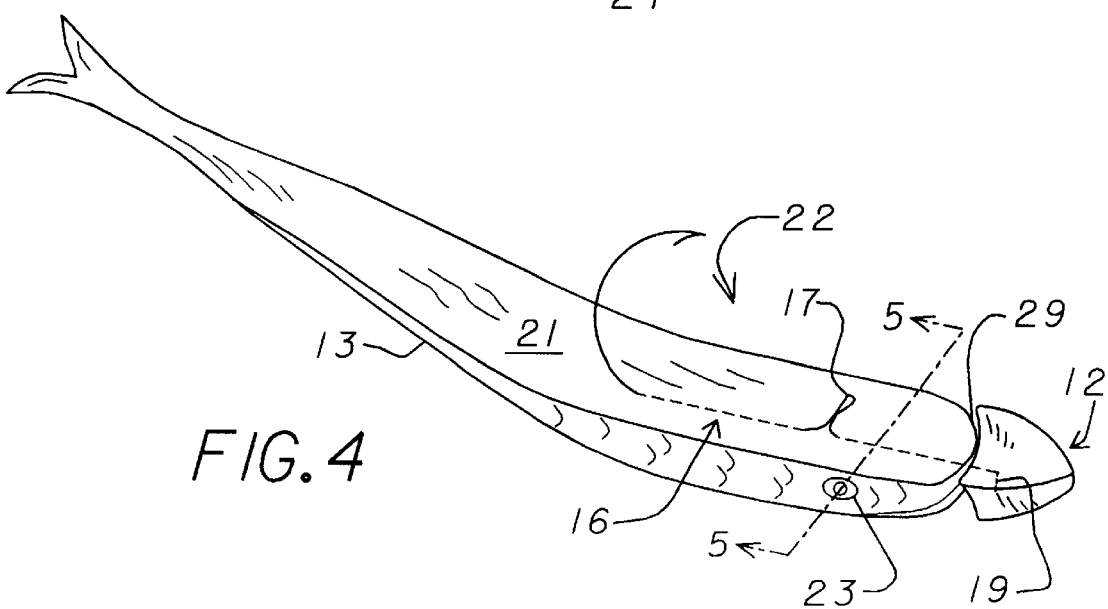
FIG. 4 is a top and side perspective view of a lure comprising the jig of FIG. 1 in association with a soft-bodied artificial bait.
Figure 5:
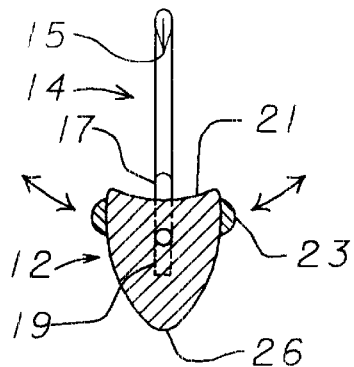
FIG. 5 is an enlarged sectional view taken in the direction of the arrows upon line 5—5 of FIG. 5.
Figure 6:
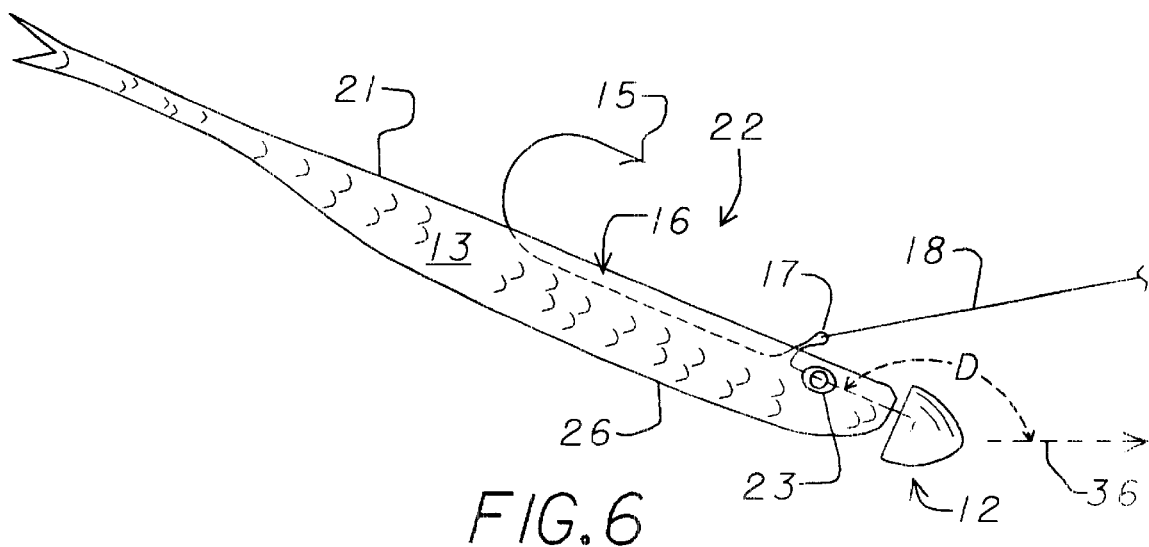
FIG. 6 is a side view of the lure of FIG. 4.

The fishing jig of this invention is intended primarily for use with a soft-bodied artificial bait component having a fish-like appearance to produce lure 22 as shown in FIGS. 4–6. Such bait components are generally fabricated of plasticized polyvinylchloride, and have sufficiently low cohesive strength to permit the passage of a fish hook component through the body of the bait component. A particularly preferred bait component is one having a flat upper region 21 and a keel-like bottom 26. When the bait component is properly impaled upon the hook component, the nose extremity 29 of the bait component will abut against weight component 12, and eyelet 17 protrudes above flat upper region 21. The bait component may be provided with fish-like indicia or attachments such as eyes 23.

By virtue of the specific construction of the fishing jig and the flat upper region of bait component 13, when the lure is pulled through the water, the bait component is caused to wriggle in an oscillatory manner as indicated by the arrowed lines in FIG. 5. In order to achieve optimum effectiveness in such manner of use, forward angle C of triangle B, taken between line 32 and leading section 33, should be between 15 and 25 degrees. Also, leading section 33 should be shorter than trailing section 34. The ratio of the length of said leading section to the length of said trailing section is preferably in the range of 0.4 to 0.8.

It is also important to note that the particular construction of the fishing jig of this invention enables the fish hook to be pushed through the body of the bait component without causing undue structural damage to the bait component. This is done by entering the barbed tip into the nose extremity, and pushing until said tip emerges from flat region 21 and directed toward said nose extremity. Furthermore, when eyelet 17 is caused to protrude above flat upper region 21, it serves to prevent the bait component from rotating about the shank component.

Referring to FIG. 6, it is seen that when line 22 is pulled through the water by line 18 in the direction shown by horizontal arrow 36, the lure assumes a critical obtuse angle of inclination D taken between shank portion 16 and horizontal line 36. Angle D may range between 165 and 150 degrees. It is only by virtue of the several critically selected features of the fishing jig and lure of the present invention that the aforesaid oscillatory wriggling motion is imparted to the lure.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A fishing jig comprising:
    a) a fish hook component of integral construction having a curved trailing extremity provided with a barbed tip, and a shank portion having a longitudinal axis which extends forwardly from said trailing extremity to a leading extremity having a weight-securing protuberance, wherein said protuberance is substantially perpendicular to said longitudinal axis said shank portion having fashioned therein by bending a line-attachment eyelet disposed in coplanar relationship with said curved trailing extremity and which divides said shank portion into leading and trailing sections on said longitudinal axis, said leading section being shorter than said trailing section whereby the ratio of the length of said leading section to the length of said trailing section is between 0.4 and 0.8, said eyelet being directed upwardly toward said barbed tip and forwardly inclined toward said leading extremity at an angle of between 30 and 70 degrees, and
    b) a weight component of streamlined shape molded onto said leading extremity and said protuberance, totally enclosing said protuberance.

2. A fishing lure comprising the fishing jig of claim 1 in combination with a soft bodied artificial bait component having a fish-like appearance having a substantially flat upper region, whereby said lure, when pulled through the water produces an oscillating wriggling motion.

3. The lure of claim 2 wherein said fish hook component penetrates said bait component in a manner causing said eyelet to protrude above said flat upper region.

4. The fishing jig of claim 1 wherein said weight component weighs between 8 and 17 grams, and the ratio of the length of said shank portion, expressed in millimeters, to the weight of said weight component, expressed in grams, is between 1.8 and 3.0.

\* \* \* \* \*